Patented Sept. 20, 1932

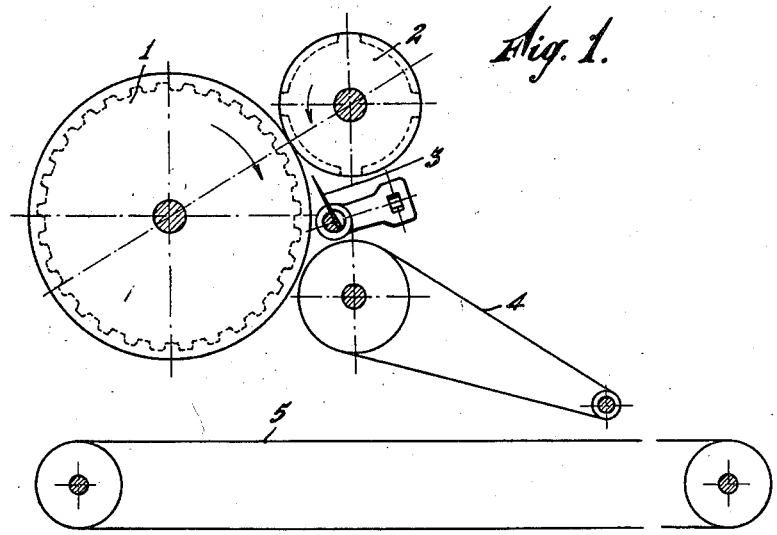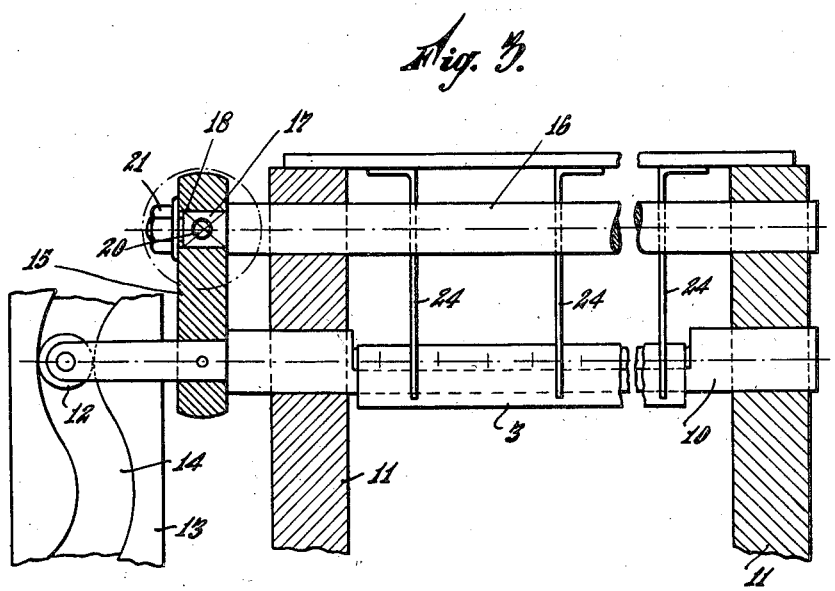

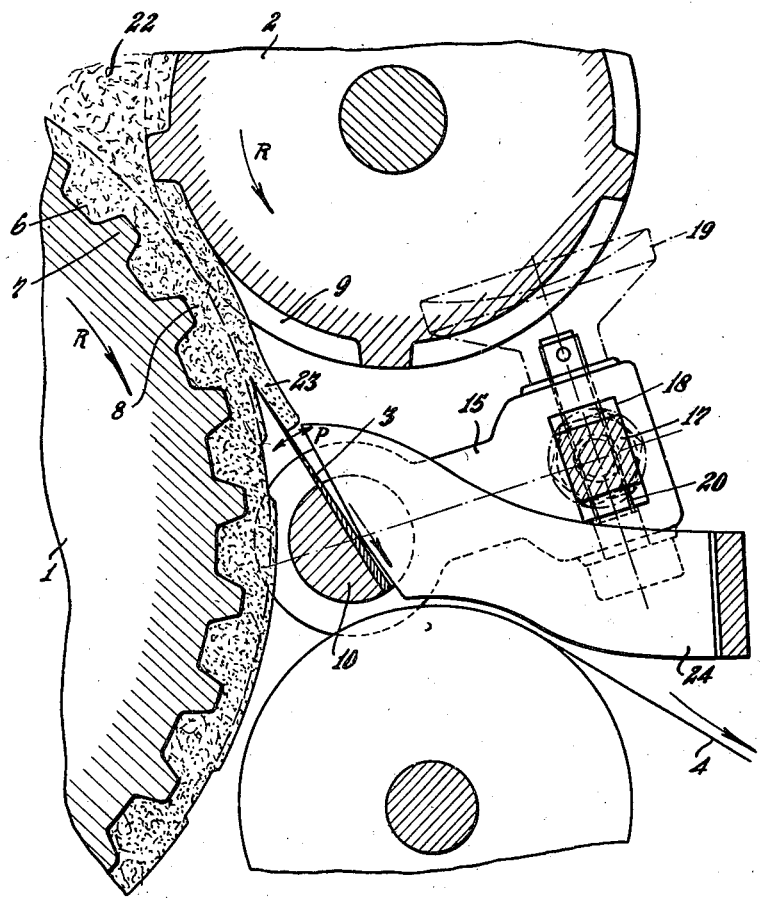

1,878,585

UNITED STATES PATENT OFFICE

ARNOLDUS CORNELIS ADRIANUS KALMEIJER, OF THE HAGUE, NETHERLANDS

MACHINE FOR SHAPING FIGURES FROM FAT- OR BUTTER-DOUGH OR OTHER PLASTIC MATERIAL

Application filed July 29, 1931, Serial No. 553,748, and in the Netherlands June 23, 1931.

The invention relates to a machine for shaping figures from fat- or butter-dough, marchpane, or other plastic materials—more specially confectionery dough—in which the figures (such as smalls, parliament cakes, biscuit ware, crackers, marchpane etc.) are formed offset on a mantle of dough carried by a feeding drum by means of a shaping or forming drum, the said figures being subsequently cut off from the mantle of dough, and thereafter are carried away to baking plates by means of a conveyor or a guiding device.

The main object of my invention is to provide a machine of the character indicated which is practical and economical in operation due to the proper positioning and proportioning of the drums thereof as well as the proper disposition of the cutting knife associated with the drums.

Other objects and the various features and advantages inherent in my invention will appear more fully in detail as the specification proceeds.

Referring now to the accompanying drawings forming part hereof,

Fig. 1 is a schematic view of the main parts of the machine, illustrating the relative position and dimension of the said parts.

Fig. 2 is a vertical cross-section of a part of the drums and the knife on almost true scale.

Fig. 3 is a plan view of the knife with its holder on almost half scale.

The proper functioning of a machine of this type depends on factors which up to the present have not been sufficiently taken into account. In known machines the figure formed to the desired shape either is cut at an incorrectly chosen point on the feeding drum or after being cut is supported in an insufficient or unsuitable manner. Then again, the relative diameters of the forming drum and the feeding drum are of great importance, but, up to the present no attention has been paid thereto. For the phenomenon is encountered, that when the dough has been formed into a figure, it tends to remain in the forming drum, due to the adhesive nature of the dough and is torn away from the dough mantle on the feeding drum, and heretofore the reason as well as the solution for removing this drawback were not understood.

However, after considerable experiment and study, it has been found that all such disadvantages of known machines may be avoided, if, according to the invention, the axis of the forming drum is located at a higher level than the axis of the feeding drum and the knife is set at such an inclination in the discharge-space between the drums that the dough figure is cut off immediately after the commencement of its discharge from the forming drum and during and after said cutting operation is supported by the knife and slides down along said knife.

Thus, according to the invention the diameter of the feeding drum is larger than that of the forming drum. Further, in case the knife is adapted to reciprocate, the said knife may also be secured to a knife rod, which is mounted in the machine frame for rotary and reciprocating movement and to which one or more arms are attached that are adjustable and associated with a second rod mounted in the machine frame for a reciprocating movement in parallel with the knife rod. Finally, the space at that side of the knife at which the figures are supported may also be subdivided into channels for guiding the cut off dough figures.

With a machine arranged in this manner very fat dough may be worked without employment of a flattening roller arranged in advance of the place when the feeding drum contacts with the forming drum. It has also become practical with a machine according to the invention that the dough for sirup waffles and marchpane and confectionery dough which could not be mechanically moulded or formed heretofore, may now be turned out in the desired form in a faultless manner.

The costs of manufacture of the novel machine are materially reduced, for parts such as the forming drums or rollers may now be of far less diameter than hitherto. The usually required additional forming drums, provided with cells having other intaglio forms therein may also be produced more readily than heretofore.

If we again refer to the drawings the machine embodying the advantageous features of the present invention may now be described.

According to Fig. 1 the machine comprises a feeding drum 1 of large diameter and a moulding, forming or figuring drum or roller 2 of small diameter, the axis of the forming drum being located at a higher level than the axis of the feeding drum. In the discharge space between the drums 1 and 2 an adjustable mounted knife 3 is set at an inclination, whereas underneath said knife a discharge device in the form of a conveying belt 4 is arranged, which device in the present embodiment carries the formed figures of dough towards the conveying belt 5 (which may be at the same time a baking floor of the moving type) or to baking plates placed thereon.

In Fig. 2 the relative positions and diameters of the drums as well as the position of the knife are clearly illustrated. The feeding drum 1 is provided in the usual way with longitudinal grooves 6 and ridges 7 for gripping and holding the mantle of dough 8 which during the working of the machine is formed on the feeding drum. The forming or figuring drum or roller 2 is provided with recesses 9 for shaping and at the same time embossing the dough figures.

The inclined knife 3 extending into the discharge space between both drums is mounted on a flattened portion of a circular knife rod 10 (Fig. 3), which is rotatably mounted in the machine frame 11. At one of its ends the said knife rod carries a roller 12, which engages an undulatory groove 14 provided in a drum 13 so as to impart to the knife rod 10 and its knife 3 a longitudinal reciprocating movement in the direction parallel to the form drum.

Furthermore, to the knife rod 10 one end of an arm 15 is secured, the said arm at its opposite end being adjustably coupled to a second circular rod 16, mounted parallel to said knife rod, and is also adapted to perform a reciprocating movement in the machine frame 11. To vary the position of the knife, the rod 16 is provided in the embodiment shown with a square end portion 17 slidable in a slot 18 in the one end of the arm 15. By means of a screw spindle 20 provided with a little handwheel 19 (Fig. 2) the end of the arm 15 is adjustable with respect to the rod 16. The attained adjustment of position may be securely fixed by turning home the nut 21 on the rod 16, so that a rigid unit is obtained.

By means of the rod system 10—16 and appertaining parts, the knife is guided and held in such a manner that on its reciprocating movement oscillating or tilting is prevented, whereas at the same time, by adjusting the arm 15 with respect to the rod 16 the cutting edge of the thin knife 3 may be adjusted towards or away from the feeding drum corresponding to the desired thickness of the figures of dough (see the double pointed arrow P in Fig. 2).

In the operation of the machine, the drums 1 and 2 are rotated in the direction of the arrows R by hand or mechanically. After a mantle of dough 8 has been accumulated on the feeding drum 1, the dough 22 (Fig. 2) is gripped between the drums 1 and 2 and pressed into the cells or other cavities of the forming drum and against the mantle of dough 8 on the feeding drum. Immediately after the circumferences of the drums leave each other and the figure of dough 23 meanwhile formed offset (Fig. 2) on the mantle of dough leaves the forming drum, the said figure is cut off from the dough mantle enveloping the feeding drum. The portion of the figure already cut off is supported by the inclined knife 3 immediately after being cut off. The dough figure finally cut off is supported further by the knife and slides down to a conveying belt 4, which conveys the figures to a baking plate moving with the belt 5 or carries the figures away. During and after the cutting operation, the dough figure remains constantly supported, so that there is no danger for deformation, damage or tilting.

In order to better ensure the downward movement of the cut off figures along the moving knife in the desired direction in such machines on which a reciprocating knife 3 is used, the space at the supporting side of the knife 3 may be subdivided by guide walls 24 or the like, into channels through which the figures may thus descend or slide. The guide walls 24 may be rigidly or adjustably secured to the machine frame. Variations may be resorted to and parts may be used without others.

Having now fully described my invention, I claim:

1. A machine for shaping figures from plastic materials such as fat dough, butter dough and marchpane, including the combination with a frame and a rotary feeding drum mounted thereon adapted to carry a mantle of dough enveloping the same, of a rotary forming drum also mounted on said frame and disposed with the axis thereof at a higher level than that of the feeding drum, a rod mounted on the machine frame for reciprocating movement, a second rod also mounted on said frame for parallel reciprocating movement with respect to said first rod, one or more arms connected to said first rod and adjustably coupled to said second rod, and a knife for cutting off the figures formed by the forming drum on the dough mantle enveloping said feeding drum, which knife is secured to said first rod and disposed at such an inclination in the discharge space between the drums that the figure of dough is cut off from the mantle of dough on the feeding drum immediately after the commencement of its discharge out of the forming drum and during and after being cut off is supported by the knife along which it slides down.

2. A machine for shaping figures from plastic materials such as fat dough, butter dough and marchpane, including the combination with a frame and a rotary feeding drum mounted thereon adapted to carry a mantle of dough enveloping the same, of a rotary forming drum of relatively smaller diameter than said feeding drum also mounted on said frame, and disposed with the axis thereof at a higher level than that of the feeding drum and a knife for cutting off the figures formed by the forming drum upon the dough mantle enveloping said feeding drum, which knife is held at such an inclination in the discharge space between the drums that the figure of dough is cut off from the mantle of dough on the feeding drum immediately after the commencement of its discharge out of the forming drum and during and after being cut off is supported by the knife along which it slides down.

3. In a machine for moulding figures of plastic materials, such as fat dough, butter dough and marchpane, the combination with a rotary feeding drum adapted to carry a handle of dough enveloping the same, of a rotary forming drum provided with peripheral recesses and the axis of which forming drum is situated on a higher level than that of the feeding drum, a knife disposed in the discharge space between said drums and inclined toward said feeding drum with the cutting edge of the knife spaced out of contact with respect to both drums, so that the individual figures of dough are cut off from the dough mantle enveloping the feeding drum immediately after the beginning of the discharge from the recesses of the forming drum, the figures of dough being supported by and sliding down along said knife during and after the cutting operation.

4. A machine for shaping figures from plastic materials such as fat dough, butter dough and marchpane, including the combination with a frame and a rotary feeding drum mounted thereon adapted to carry a mantle of dough enveloping the same, of a rotary forming drum of relatively smaller diameter than said feeding drum also mounted on said frame, and disposed with the axis thereof at a higher level than that of the feeding drum, a rod mounted on the machine frame for reciprocating and rotary movement, a second rod also mounted on said frame for parallel reciprocating movement with respect to said first rod, a member in the form of an arm connected to said first rod and adjustably coupled to said second rod, and a knife for cutting off the figures formed by the forming drum on the dough mantle enveloping said feeding drum, which knife is secured to said first rod and disposed at such an inclination with respect to said feeding drum and having the cutting edge thereof spaced out of contact with respect to both drums, so that the individual figures of dough are cut off from the dough mantle enveloping the feeding drum immediately after the beginning of the discharge from the recesses of the forming drum, the figures of dough being supported by and sliding down along said knife during and after the cutting operation.

In testimony whereof I affix my signature.

ARNOLDUS CORNELIS ADRIANUS KALMEIJER.